United States Patent [19]

Wittler et al.

[11] Patent Number: 4,823,926

[45] Date of Patent: Apr. 25, 1989

[54] ELECTRIC MOTOR REGULATING AND CONTROL DRIVE HAVING A CLUTCH-BRAKE UNIT

[75] Inventors: Hilmar Wittler, Karlsruhe; Adolf Martin, Rheinstetten; Herbert Palloch, Schwetzingen/Baden, all of Fed. Rep. of Germany

[73] Assignee: Frankl & Kirchner GmbH & Co. KG, Schwetzingen/Baden, Fed. Rep. of Germany

[21] Appl. No.: 94,147

[22] Filed: Sep. 8, 1987

[30] Foreign Application Priority Data

Sep. 20, 1986 [DE] Fed. Rep. of Germany ..... 36332064

[51] Int. Cl.$^4$ ........................ F16D 67/06; F16D 69/04
[52] U.S. Cl. .................. 192/18 B; 192/30 V; 192/84 C; 192/107 C; 188/73.38; 310/76
[58] Field of Search ................ 192/18 B, 30 V, 84 C, 192/107 R, 107 C; 188/73.37, 73.38, 218 XL, 250 E; 310/76, 98

[56] References Cited

U.S. PATENT DOCUMENTS

| | | | |
|---|---|---|---|
| 2,048,501 | 7/1936 | Goosman | 192/30 V |
| 3,307,669 | 3/1967 | Klinkenberg | 192/107 R |
| 3,326,343 | 6/1967 | Stuckens et al. | 192/84 C |
| 3,543,901 | 12/1970 | Lengsfeld et al. | 192/30 V X |
| 3,565,223 | 2/1971 | Pierce | 192/107 C X |
| 3,762,516 | 10/1973 | Matsushita | 192/84 C |
| 4,556,132 | 12/1985 | Lengsfeld et al. | 192/12 BA |
| 4,557,360 | 12/1985 | Kumatani | 192/30 V X |
| 4,709,794 | 12/1987 | Lengsfeld et al. | 192/18 B |

FOREIGN PATENT DOCUMENTS

| | | | |
|---|---|---|---|
| 54-141954 | 11/1979 | Japan | 188/73.37 |
| 60-237229 | 11/1985 | Japan | 192/84 C |
| 1575763 | 9/1980 | United Kingdom . | |

*Primary Examiner*—Rodney H. Bonck
*Assistant Examiner*—Richard M. Lorence
*Attorney, Agent, or Firm*—Felfe & Lynch

[57] ABSTRACT

In an electric motor regulating and control drive, especially for industrial sewing machines, a clutch-brake disk is mounted for co-rotation on an output shaft and has a clutch facing which can be brought into engagement with a clutch surface of a flywheel of the corresponding motor, and has a brake facing which can be brought into engagement with a brake surface of a brake-bearing plate. In order to achieve by simple means an effective suppression of impact noises when a braking action is initiated, at least the brake facing is mounted with damping with respect to the armature ring of the clutch-brake disk. It is preferably thrust against the armature ring by means of at least one annular spring.

3 Claims, 2 Drawing Sheets

ELECTRIC MOTOR REGULATING AND CONTROL DRIVE HAVING A CLUTCH-BRAKE UNIT

BACKGROUND OF THE INVENTION

The invention relates to an electric motor regulating and control drive.

Such a drive is disclosed in German patent publication DE-OS No. 32 23 379 (corresponding to U.S. Pat. No. 4,556,132). Especially when such drives are used in industrial sewing machines, start-stop operations are extremely frequent, with the result that the clutch-brake unit is always slipping either on the clutch side or on the brake side, i.e., it becomes very hot in operation. The result is that the brake facings and especially the clutch facings swell up, i.e., undergo a thermally caused expansion. This is true especially of the cork facings and linings used for the sake of their long useful life. In order to have sufficient clutch clearance, and sufficient brake clearance in the case of brakes, after the brake facing and clutch facing have swollen up, the clutch clearance and the brake clearance must be made relatively great while the drive is cold. As a result, however, when braking is abrupt, i.e., when the clutch or brake disk comes out of engagement with the flywheel and into engagement with the opposite brake bearing, impact noises are produced. To suppress this noise in the drive according to DE-OS No. 32 23 379 (corresponding to U.S. Pat. No. 4,556,132) which describes this class of drives, a thermally sensitive adjusting means is provided for the automatic adjustment of the clutch clearance by shifting the flywheel and clutch-brake disk relative to one another. Such an adjustment by a thermally sensitive adjusting means is a good basic solution to the problems described, but since the heat has to be conducted away from the point where it develops, to the thermally sensitive adjusting means, especially between the clutch facing and the clutch surface on the flywheel, errors, and especially a certain lagging of the system, are unavoidable.

The invention is therefore addressed to the problem of configuring the drive such that, by means of especially simple design, the impact noises which occur when a braking action is initiated will be suppressed.

SUMMARY OF THE INVENTION

This problem is solved according to the invention. The impact noises are therefore suppressed or damped at the point where they develop, i.e., their propagation as body noise is largely suppressed. The measures taken according to the invention make it possible to set a clutch clearance in the cold state that will be large enough so that, even after the brake facing, and especially the clutch facing, has swollen, a sufficient clearance will still be available for proper operation.

In a preferred embodiment of the invention, it is brought about that the impact of the brake facing on the braking surface is extended over a longer period of time, since a distance of a few tenths of a millimeter is available to absorb the impact. The impact is thus softened. The impact energy is reversibly absorbed, but the impact duration is lengthened. The configuration permits an especially compact and effective resilient backing of the brake facing. A further development brings it about that, even with the resilient backing of the brake facing, body sound is propagated only to a very slight extent. A further development has the result that, in the case of especially hard impacts, additional spring movement is available. If the impact of the brake facing on the brake surface should be so severe that the spring ring collides with the armature ring, the noise thus produced is damped, at least to a great extent.

In accordance wtih the invention, an electric motor regulating and control drive, especially for industrial sewing machines, comprises a constantly drivable motor having a motor shaft. The drive includes a flywheel attached to the motor shaft and having a clutch surface. The drive includes an output shaft and a clutch-brake unit including a clutch-brake disk which is affixed to and co-rotational with the output shaft and which has an armature ring with a brake facing and a clutch facing. The drive includes a nonrotating brake bearing member provided with a brake surface. The clutch-brake disk is selectively displaceable into frictional engagement with the brake surface of the brake bearing member or with the clutch surface of the flywheel. The drive also includes a clutch winding and a brake winding with which the armature ring is associated. At least the brake facing is mounted dampingly with respect to the armature ring.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings.

DETAILED DESCRIPTION OF PREFERRED EMBODIMENT

Figure 1:
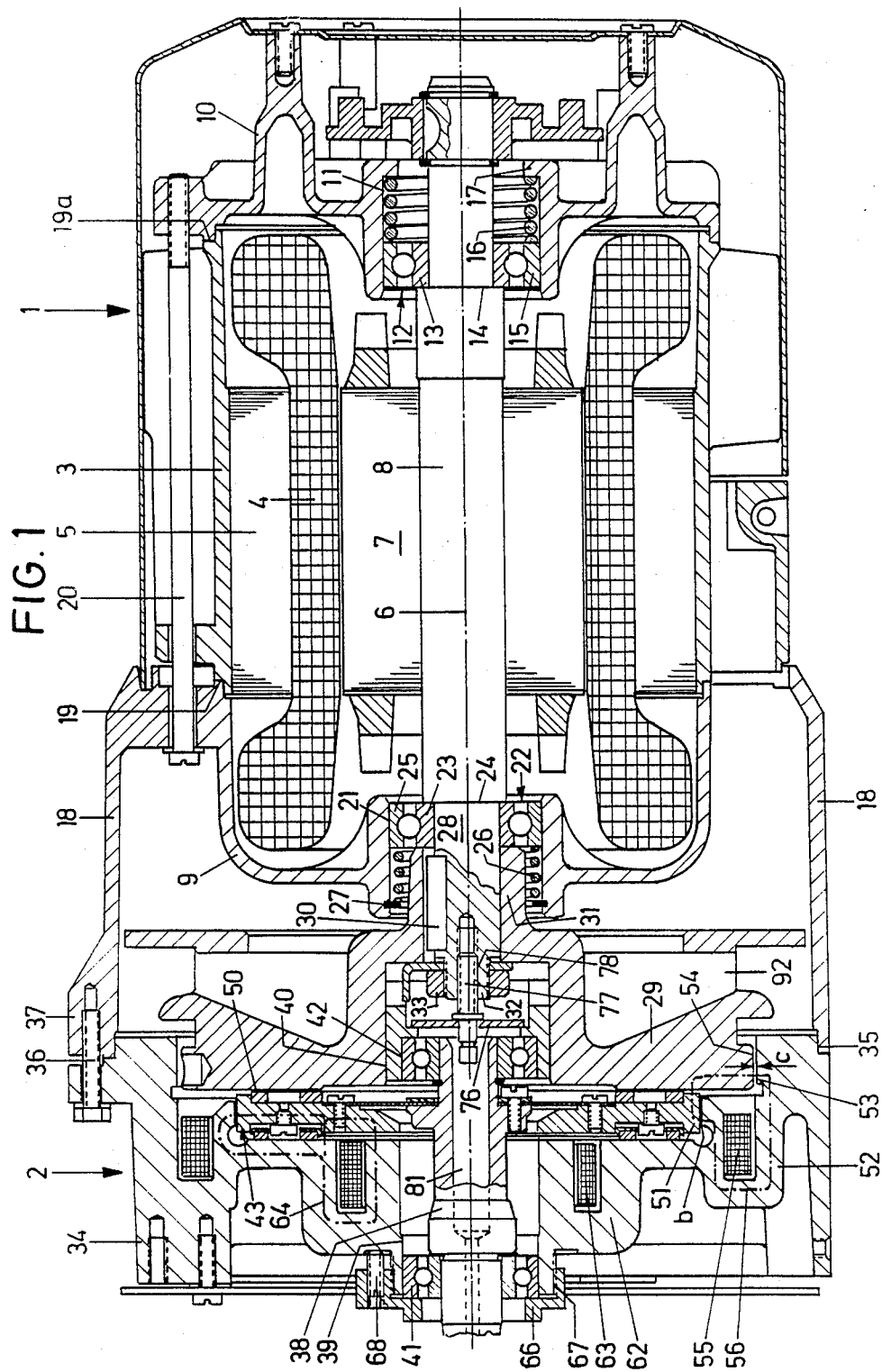
FIG. 1 is longitudinal axial sectional view of a drive according to the invention, comprising a motor and clutch-brake unit.
Figure 2:
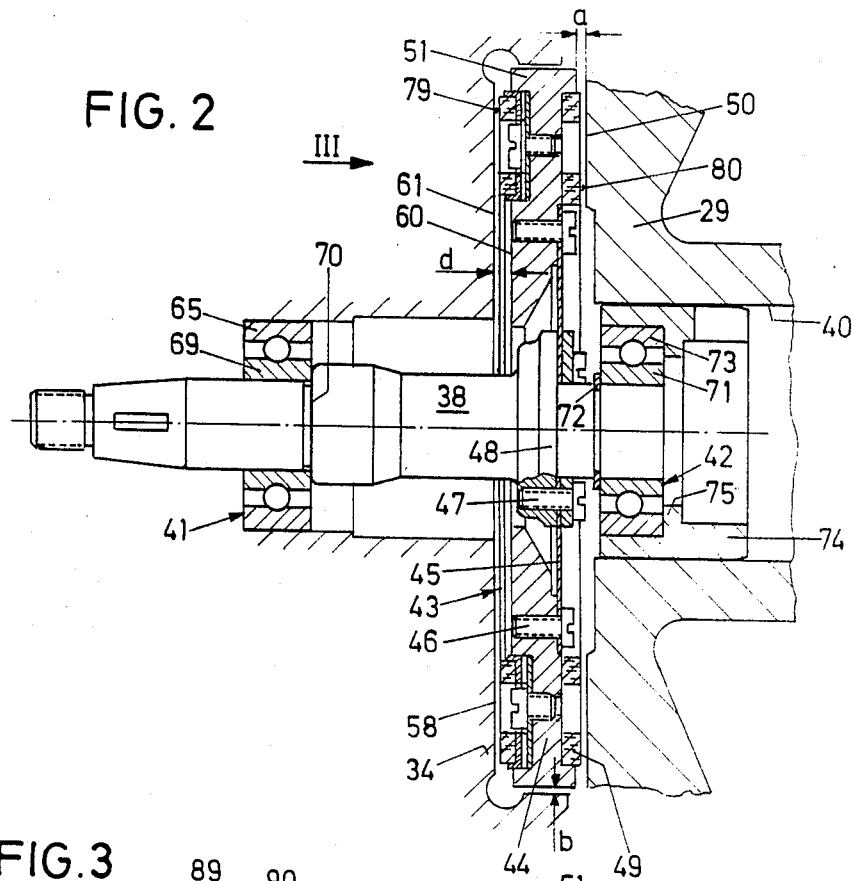
FIG. 2 is a detailed view on a larger scale than in FIG. 1 of a the clutch-brake unit.

The drive represented in the drawing consists of a motor 1 and a brake-clutch unit 2. The motor has a substantially cylindrical stator casing 3 in which a stator formed conventionally of stator windings 4 and a laminated stator 5 is concentrically disposed. A rotor 7 is likewise concentric with the central longitudinal axis 6 and is mounted on a motor shaft 8. The motor shaft is journaled in bearing plates 9 and 10. In a bearing bore 11 of the bearing plate 10 remote from the brake-clutch unit 2, the motor shaft 8 is journaled in a rolling-contact bearing, which is a radial-axial ball bearing, the inner ring 13 of the ball bearing 12 being supported against a collar 14 on the motor shaft 8. At the other axial end the outer ring 15 of the rolling-contact bearing 12 is urged by a compression coil spring 16 against an abutment ring 17 integral with the bearing plate 10, so that on the one hand the rolling-contact bearing 12 is secured against axial shifting on the motor shaft 8 but on the other hand axial adjusting movements of the motor shaft are possible within the play given by the spring 16. The bearing plate 9 is made integral with an approximately cylindrical casing 18. The two bearing plates 9 and 10 are joined together by means of bolts 20 and centered on the stator casing 3 by abutments 19 and 19a so that they form a unit with the stator casing. In the bearing bore 21 of this bearing plate 9 the motor shaft 8 is also supported on a srolling-contact bearing in the form of a radial-axial ball bearing. Here, again, the inner ring 23 of the rolling-contact bearing 22 lies against a shoulder 24 on the motor shaft 8, while the outer ring 25 of the rolling-bearing contact 22 is thrust by a compression coil spring 26 against a retaining ring 27 set in the bearing bore 21, which thus serves the same abutment function as the abutment ring 17 in the bearing plate 10. The function of spring 26 consists in biasing the outer ring 25 of the rolling-contact bearing 22 in the axial direction, in order thus to prevent the development of noise. If the outer ring of a rolling-contact bearing has no abutment, such a rolling-contact bearing tends to oscillate and thus to generate noise. The force of spring 26 must be definitely lower than that of the spring 16 so as not to cancel its function.

On the end 28 of the motor shaft 8, on which the rolling-contact bearing 22 is disposed, a flywheel 29 is locked by means of a spline joint 30. The flywheel 29 lies with the free face of its boss 31 against the inner ring 23 of the rolling-contact bearing 22 and is tightened axially against the inner ring 23 by means of a nut 33 screwed onto a threaded stud 32 on the shaft end 28, thereby simultaneously locking it axially with respect to the motor shaft 8. The unit formed of the rotor 7, the motor shaft 8, together with the rolling-contact bearings 12 and 22 and the flywheel 29 is thus displaceable in the direction of the longitudinal central axis 6, while the springs 16 and 26 exercise a counter-thrust.

The casing 18 is closed at the end remote from the motor 1 by a brake bearing plate 34 which is centered on the casing by centering shoulders 35 and thus is coaxial with the axis 6. The brake bearing plate 34 is fastened by means of screws 36 to a matching flange 37 on the casing 18.

An output shaft 38 disposed coaxially to the longitudinal central axis 6 is journaled at one end in a bearing bore 39 of the brake bearing plate 34 and at the other end in a bearing bore 40 in the flywheel 29 so as to be able to rotate freely with respect to the latter. The output shaft 38 is journaled in rolling-contact bearings 41, 42, in the bearing bores 39 and 40, both of which are radial-axial ball bearings. A clutch-brake disk 43 is affixed to the output shaft 38 between the rolling-contact bearings 41 and 43. The clutch-brake disk 43 has an outer armature ring 44 of magnetic material. To this armature ring 44 a disk spring 45 is fastened at its outer margin by screws 46. At its inner margin the disk spring 45 is fastened by screws 47 to an annular shoulder 48 projecting radially from the output shaft 38. This method of fastening by means of a thin disk spring 45 permits movements of the armature ring 44 in the direction of the axis 6, coaxial to the latter.

On the side of the armature ring 44 facing the flywheel 29 an annular friction facing serving as a clutch facing 49 is fastened by cementing. A corresponding flat annular clutch surface 50 on the confronting side of the flywheel 29 is associated with this clutch facing. The armature ring 44 has on its outer circumference a rim 51 projecting axially toward the flywheel 29 which reaches toward the flywheel 29 with a small axial gap a of only a few tenths of a millimeter. The annular clutch facing 49 reaches at its outer circumference about as far as the inside circumference of the rim 51.

The brake bearing plate 34 has a clutch coil casing 52 which radially surrounds the armature ring with a small radial clearance b of likewise only a few tenths of a millimeter, and with a radially outer annular casing portion 53, surrounds a radial circumferential section 54 of the flywheel 29 adjacent the clutch face 50 leaving a radial gap or clearance c which likewise is only a few tenths of a millimeter wide. In the clutch coil casing 52 of the fixed brake bearing plate 34 there is disposed an annular electromagnet clutch coil 55 by whose excitation a clutch magnetic circuit 56 is completed from the clutch coil casing 52 through the casing portion 53, the radial gap c, the circumferential section 54 of the flywheel 29, the axial gap a, the rim 51 of the armature ring 44, radial gap b, and back to the clutch coil housing 52. This forces the clutch-brake disk 43 with its clutch facing 49 against the clutch surface 50 of the flywheel 29, thereby coupling the output shaft 38 to the motor shaft 8.

On the side facing away from the flywheel the armature ring 44 is provided with a friction facing serving as a brake facing 57, which in a manner described in greater detail below is fastened to the armature ring 44. With it is associated a flat annular brake surface 58 in the brake bearing plate 34. The armature ring comprising magnetic material extends radially inwardly to the near vicinity of the annular shoulder 48 thereby creating a flat annular magnetic transfer surface 60 on the armature ring 44, which confronts the brake coil casing surface 61 lying within the brake surface 58 and flush with the latter, leaving a narrow axial gap d. In the brake bearing plate 34 there is formed a brake coil casing 62 which is closed at its face by the brake coil casing surface 61. In this brake coil casing 62 is disposed an annular brake coil 63 such that magnetic flux can be transferred radially within the brake coil 63 and radially outside of the brake coil 63, but still within the brake facing 57. When the brake coil 63 is excited, therefore, a braking magnetic flux field 64 forms, one part of which runs radially outside of the brake coil 63 through the brake coil casing 62, the axial gap d between the brake coil casing fact 61 and the magnetic transfer surface 60 (between the brake facing 57 and the brake coil 63 in each case), radially inwardly through the armature ring 44, and the axial gap d, radially inside the brake coil 63, and back into the brake coil casing 62. Another part of the braking magnetic flux field 64 runs radially outwardly into the clutch coil casing 52, inwardly through the radial gap b and radially through the armature ring 44, where the two flux fields meet again.

The outer ring 65 of the rolling-contact bearing 41 lies against an axially adjustable bearing cover 66 whose axial position relative to the brake bearing plate 34 is adjustable by means of a screw thread 67. The bearing cover 66 itself can be locked with respect to the brake bearing plate 34 by means of setscrews 68. The inner ring 69 of the rolling-contact bearing 41 lies with its side opposite the outer bearing cover 66 and facing the clutch-brake disk 43 against an annular shoulder 70 on the output shaft 38. Thus, the axial position of the output shaft 38 and with it the axial position of the clutch and brake disk 43 affixed thereon can be adjusted relative to the brake bearing plate 34.

The inner ring 71 of the rolling-contact bearing 42 lies on its side facing the clutch-brake disk 43 against an abutment 72 formed by a retaining ring and fastened to the output shaft 38. The outer ring 73 of this roller bearing 42 is radially supported in a sleeve 74 which is disposed in the bearing bore 40. This sleeve 74 has an internal flange 75 projecting radially inwardly, with which the outer ring 73 of the rolling-contact bearing 42 is in contact on the side facing the motor 1. Against this internal flange 75 of the sleeve 74 a plate serving as an adjuster 76 is supported in the axial direction and is in turn supported axially by an adjusting screw 77 which in turn is threaded into a tapped hole 78 coaxial with the axis 6 in the motor shaft 8. With this configuration, the motor shaft 8 can be adjusted together with the flywheel 29 relative to the output shaft by means of the clutch-brake disk 43. The motor shaft 8 and the output shaft 38 are urged by the helical compression spring 16 against the bearing cover 66. The displacement of the output shaft 38 by means of the bearing cover 66 toward the motor 1 and the displacement of motor shaft 8 with flywheel 29 in the direction of the bearing plate 10 is performed against the force of the compression spring 16, while in the converse case the bearing cover 66 and adjusting screw 77 are loosened causing the displacement to be performed by the compression spring 16. Thus, by means of the bearing cover 66, the axial width of the brake clearance, i.e., of the gap between the brake facing 57 and the brake surface 58, is adjusted. By means of the adjusting screw 77 the axial width of the clutch clearance 80, i.e., of the gap between the clutch facing 49 and the clutch surface 50 is adjusted. These clearances 79 and 80 are to be understood to refer to the air gaps which are established when the clutch coil 55 and the brake coil 63 are in the unexcited state. It is to be noted that the brake clearance 79 in practice often amounts to zero, i.e., when the coils 55 and 63 are not energized, the brake facing 57 is in light contact with the brake surface 58. The adjusting screw 77 can be accessed with a screwdriver or the like from the exterior through a hole 81 passing axially through the output shaft 38.

Such drives are used especially for driving industrial sewing machines, in whose operation the start-stop frequency may amount to as much as 3000 operating cycles per hour. This means that the brake-clutch unit is almost constantly driven either with the clutch facing 49 slipping on the clutch surface 50 or with the brake facing 57 slipping on the brake surface 58. This results in an extraordinarily great heating especially of the clutch facing 49, but also of the brake facing. This heating of the clutch facing 49 and the brake facing 57, in spite of considerable cooling action, leads again to a so-called "swelling" of these facings 49 and 57, i.e., to a thermally caused axial expansion of these facings. This swelling is in the range of 0.1 mm for both facings 49 and 57. The clutch clearance 80 must therefore be adjusted, with the drive in the cold state, to about 0.1 to 0.3, preferably 0.2 mm. In this case, however, in a hard braking action, i.e., when the drive is braked down from a rotatory speed of, say, 3000 rpm, i.e., from a sewing machine speed of 6000 to 8000 rpm, in less than one second, impact noise is produced when the brake facing 57 hits the brake surface 58. To suppress this impact noise the clutch and brake disk 43 is configured in the manner described herein. The annular brake facing 57 is fastened by cementing in a holding ring 82 which is turned partially around the inside and outside edges of the brake facing 57. This holding ring 82 is fastened by rivets 84 on an annular spring 83. In the area where this holding ring 82 is fastened, four shallow raised areas 85 are formed, so that the holding ring 82 is in contact with the annular spring 83 only where the fastening by rivets 84 is located, while the holding ring 82 and annular spring 83 are otherwise freely face one another with a gap 86 between them.

Figure 3:
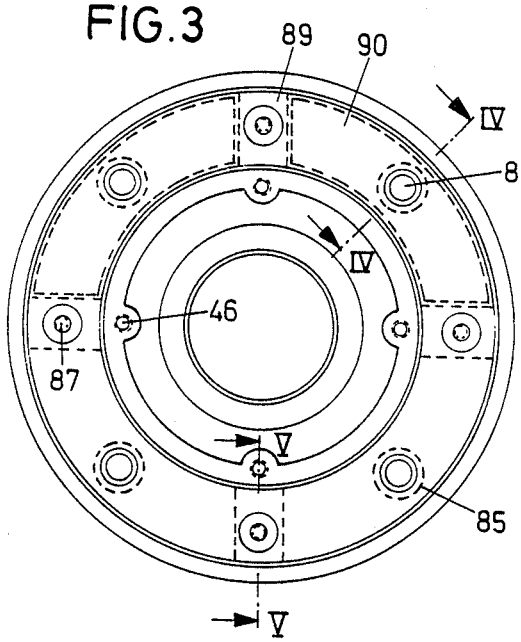
FIG. 3 is a front view of a clutch-brake disk corresponding to the arrow III in FIG. 2.
Figure 4:
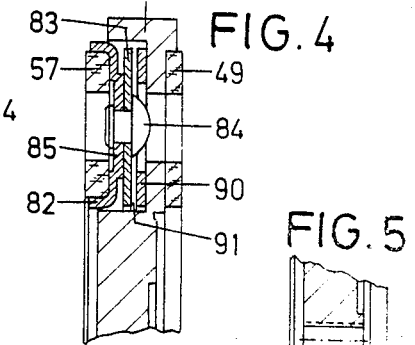
FIG. 4 is a detailed cross sectional view taken on the section line IV—IV through FIG. 3.
Figure 5:
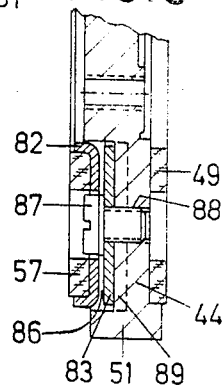
FIG. 5 is an additional detailed cross sectional view through FIG. 3 corresponding to the section line V—V in FIG. 3.

The annular spring 83 is in turn fastened to the armature ring 44 by means of screws 87. In the area of the tap 88 in the armature ring 44, which receive the screws 87, are formed the lands 89 surrounding only these taps 88, and the annular spring 83 rests against these lands. There are four rivets disposed with an angular spacing of 90°, and screws 87 with taps 88 with the same angular spacing, the rivets 84 on the one hand and the screws 87 on the other being spaced 45° apart as can be seen especially in FIG. 3.

Between two adjacent lands 89 are segment-shaped damping pads 90. Between these and the annular spring 83 there is formed a strike-through gap 91.

When there is a shift from driving to braking, i.e., when the brake coil 63 is energized and the clutch-brake disk is shifted from the position in which the clutch facing 49 is engaged with the clutch surface 50, across the clutch air gap 60 and the brake air gap 79 to the brake surface 58, the brake facing 57 strikes against the latter. This causes the annular spring 83 to flex axially, i.e., in the direction of the axis 6, without allowing the support ring 82 to contact the annular spring 83 between the rivets 84. The impact of the brake facing 57 on the brake surface 58 is thus resiliently absorbed without appreciably transmitting any body sound in the clutch-brake disk. In the event of the abrupt braking already explained, the annular spring 83 can flex to such an extent that it can come into contact with the damping pads 90 between the lands 89. These damping pads 90, made of an appropriate cushioning plastic, absorb the impact noise.

For the sake of completeness it is mentioned that radially extended fan vanes 92 are formed on the side of the flywheel 29 facing the motor 1 and produce a cooling air flow through the motor 1 and the brake clutch unit 2.

Surprisingly, it has been found that the spring element formed by an annular spring 83 also suppresses the squeaking of the clutch facing 59 and of the brake facing 57 which is produced when they rub against the corresponding clutch surface 50 and brake surface 58. The reason for this is that the armature ring 44 is reinforced by the annular spring 83.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electric motor regulating and control drive, especially for industrial sewing machines, comprising:
   a constantly drivable motor having a motor shaft;
   a flywheel attached to said motor shaft and having a clutch surface;
   an output shaft;
   a clutch-brake unit including a clutch-brake disk which is affixed to and co-rotational with said input shaft and which has an armature ring with a brake facing and a clutch facing;
   a nonrotating brake bearing member provided with a brake surface;

said clutch-brake disk being selectively displaceable into frictional engagement with said brake surface of said brake bearing member or with said clutch surface of said flywheel;

said frictional engagement causing said brake facing and said clutch facing to swell because of heating during operation, thereby thermally causing axial expansion of said facings requiring a gap between said clutch facing and said clutch surface and a gap between said brake facing and said brake surface;

a clutch winding and a brake winding, both for displacing said clutch-brake disk, with which said armature ring is associated;

at least said brake facing being mounted dampingly with respect to said armature ring, damping means being provided between said brake facing and saidi armature ring;

in said damping means, at least one spring element for mounting between said brake facing and said armature ring, means for supporting said brake facing against said spring element leaving a spring gap between said brake facing and said spring element for resiliently absorbing the impact of said brake facing on said brake surface, and means for supporting said spring element against said armature ring leaving a strike-through gap between said armature ring and said spring element so that in the event of abrupt braking said spring element can flex to such an extent as to contact damping pads between lands of said armature ring.

2. A drive according to claim 1, in which said damping means includes damping elements between said spring element and said armature ring.

3. A drive according to claim 1, in which said at least one spring element is an annular spring.

* * * * *

UNITED STATES PATENT AND TRADEMARK OFFICE
CERTIFICATE OF CORRECTION

PATENT NO. : 4,823,926
DATED : April 25, 1989
INVENTOR(S) : Hilmar Wittler, et al.

It is certified that error appears in the above-identified patent and that said Letters Patent is hereby corrected as shown below:

In the Heading Foreign Application Priority Data for "36332064" read -- 3632064 --.

Column 3, line 6 for "srolling-contact" read

-- rolling-contact --.

Column 7, line 16 (misnumbered as line 18)

for "saidi" read -- said --.

Signed and Sealed this

Second Day of October, 1990

Attest:

HARRY F. MANBECK, JR.

Attesting Officer     Commissioner of Patents and Trademarks